(12) United States Patent
Starobin et al.

(10) Patent No.: US 12,294,837 B2
(45) Date of Patent: May 6, 2025

(54) MULTI-ZONE MEDIA SYSTEM AND METHOD FOR PROVIDING MULTI-ZONE MEDIA

(71) Applicant: Sound United, LLC, Vista, CA (US)

(72) Inventors: Bradley M. Starobin, Baltimore, MD (US); Matthew Lyons, York, PA (US); Stuart W. Lumsden, Ruxton, MD (US); Michael DiTullo, Encinitas, CA (US); Paul O'Connor, Portland, OR (US)

(73) Assignee: SOUND UNITED, LLC., Vista, CA (US)

( * ) Notice: Subject to any disclaimer, the term of this patent is extended or adjusted under 35 U.S.C. 154(b) by 0 days.

(21) Appl. No.: 18/437,777

(22) Filed: Feb. 9, 2024

(65) Prior Publication Data
US 2024/0187802 A1    Jun. 6, 2024

Related U.S. Application Data

(63) Continuation of application No. 17/370,018, filed on Jul. 8, 2021, which is a continuation of application No. 16/997,075, filed on Aug. 19, 2020, now Pat. No. 11,082,785, which is a continuation of application No. 16/735,753, filed on Jan. 7, 2020, now Pat. No. 10,798,505, which is a continuation of application No. 15/894,591, filed on Feb. 12, 2018, now Pat. No. 10,567,893, which is a continuation of application No. 15/445,291, filed on Feb. 28, 2017, now Pat. No. 9,894,451, which is a continuation of application No.
(Continued)

(51) Int. Cl.
*H04R 27/00* (2006.01)
*G06F 3/041* (2006.01)
*G06F 3/0488* (2022.01)
*G06F 3/16* (2006.01)

(52) U.S. Cl.
CPC .............. *H04R 27/00* (2013.01); *G06F 3/041* (2013.01); *G06F 3/0488* (2013.01); *G06F 3/165* (2013.01); *G06F 3/167* (2013.01); *H04R 2227/003* (2013.01); *H04R 2227/005* (2013.01); *H04R 2430/01* (2013.01)

(58) Field of Classification Search
CPC .............. H04R 27/00; H04R 2227/003; H04R 2227/005; H04R 2430/01; G06F 3/041; G06F 3/0488; G06F 3/165; G06F 3/167
USPC .......................................................... 381/81
See application file for complete search history.

(56) References Cited

U.S. PATENT DOCUMENTS

| 6,631,350 | B1 | 10/2003 | Celi, Jr. et al. |
|---|---|---|---|
| 7,995,770 | B1 | 8/2011 | Simon |
| 8,270,626 | B2 | 9/2012 | Shridhar |

(Continued)

FOREIGN PATENT DOCUMENTS

| CA | 2694327 A1 | 2/2009 |
|---|---|---|
| CN | 108228064 A | 6/2018 |

(Continued)

*Primary Examiner* — Sean H Nguyen
(74) *Attorney, Agent, or Firm* — McAndrews, Held & Malloy, Ltd.

(57) ABSTRACT

A multi-zone media system and method for providing multi-zone media. As a non-limiting example, various aspects of this disclosure provide a system and method that flexibly presents media content (e.g., audio content) to a user as the user moves throughout a premises.

20 Claims, 6 Drawing Sheets

Related U.S. Application Data

14/725,904, filed on May 29, 2015, now Pat. No. 9,584,935.

(56) References Cited

U.S. PATENT DOCUMENTS

| | | |
|---|---|---|
| 8,462,961 B1 | 6/2013 | Bywaters |
| 8,473,293 B1 | 6/2013 | Mengibar |
| 8,611,552 B1 | 12/2013 | Murgia |
| 8,620,667 B2 | 12/2013 | Andrew |
| 9,015,049 B2 | 4/2015 | Baldwin |
| 9,484,021 B1 | 11/2016 | Mairesse |
| 9,558,740 B1 | 1/2017 | Mairesse |
| 9,584,935 B2 | 2/2017 | Starobin et al. |
| 9,600,231 B1 | 3/2017 | Sun |
| 9,668,024 B2 | 5/2017 | Os |
| 9,706,320 B2 | 7/2017 | Starobin et al. |
| 9,721,570 B1 | 8/2017 | Beal et al. |
| 9,767,786 B2 | 9/2017 | Starobin et al. |
| 9,894,451 B2 | 2/2018 | Starobin et al. |
| 9,916,839 B1* | 3/2018 | Scalise .................... G10L 15/22 |
| 9,966,065 B2 | 5/2018 | Gruber |
| 9,972,318 B1 | 5/2018 | Kelly et al. |
| 10,068,573 B1 | 9/2018 | Aykac et al. |
| 10,089,981 B1 | 10/2018 | Elangovan |
| 10,127,908 B1 | 11/2018 | Deller et al. |
| 10,192,539 B2 | 1/2019 | Starobin et al. |
| 10,341,793 B2 | 7/2019 | Starobin et al. |
| 10,462,590 B2 | 10/2019 | Starobin et al. |
| 10,515,623 B1 | 12/2019 | Grizzel |
| 10,567,893 B2 | 2/2020 | Starobin et al. |
| 10,652,678 B2 | 5/2020 | Starobin et al. |
| 10,657,949 B2 | 5/2020 | Starobin et al. |
| 10,672,379 B1 | 6/2020 | Ellert |
| 10,692,485 B1 | 6/2020 | Grizzel |
| 10,692,489 B1 | 6/2020 | Grizzel |
| 10,706,843 B1 | 7/2020 | Elangovan |
| 10,783,876 B1 | 9/2020 | Hoover |
| 10,798,505 B2 | 10/2020 | Starobin et al. |
| 11,016,968 B1 | 5/2021 | Hoover |
| 11,082,785 B2 | 8/2021 | Starobin et al. |
| 11,356,520 B2 | 6/2022 | Starobin et al. |
| 11,496,591 B2 | 11/2022 | Starobin et al. |
| 2001/0055356 A1 | 12/2001 | Davies |
| 2003/0023741 A1 | 1/2003 | Tomassetti |
| 2005/0080849 A1 | 4/2005 | Wee et al. |
| 2005/0248548 A1 | 11/2005 | Tsumura |
| 2005/0251832 A1 | 11/2005 | Chiueh |
| 2006/0064533 A1 | 3/2006 | Rael |
| 2006/0271351 A1 | 11/2006 | Mirkovic et al. |
| 2008/0065235 A1 | 3/2008 | Igoe |
| 2008/0066094 A1 | 3/2008 | Igoe |
| 2010/0260345 A1 | 10/2010 | Shridhar |
| 2010/0315549 A1 | 12/2010 | Basso et al. |
| 2010/0323793 A1 | 12/2010 | Andall |
| 2011/0211584 A1 | 9/2011 | Mahmoud |
| 2012/0030228 A1 | 2/2012 | Naidu et al. |
| 2012/0039495 A1 | 2/2012 | Ono |
| 2012/0096110 A1 | 4/2012 | Sadovsky et al. |
| 2012/0117026 A1 | 5/2012 | Cassidy |
| 2012/0163603 A1 | 6/2012 | Abe et al. |
| 2012/0190339 A1 | 7/2012 | Abe et al. |
| 2013/0024018 A1 | 1/2013 | Chang et al. |
| 2013/0076651 A1 | 3/2013 | Reimann |
| 2013/0170647 A1 | 7/2013 | Reilly |
| 2013/0173064 A1 | 7/2013 | Fadell |
| 2014/0002383 A1 | 1/2014 | Hsieh |
| 2014/0046464 A1 | 2/2014 | Reimann |
| 2014/0064501 A1 | 3/2014 | Olsen |
| 2014/0075306 A1 | 3/2014 | Rega |
| 2014/0093085 A1* | 4/2014 | Jarvis .................... H04R 27/00 381/17 |
| 2014/0244013 A1 | 8/2014 | Reilly |
| 2015/0010169 A1 | 1/2015 | Popova |
| 2015/0074528 A1 | 3/2015 | Sakalowsky et al. |
| 2015/0096876 A1 | 4/2015 | Mittleman |
| 2015/0097689 A1 | 4/2015 | Logue |
| 2015/0100143 A1 | 4/2015 | Gao |
| 2015/0104037 A1 | 4/2015 | Lee |
| 2015/0121406 A1 | 4/2015 | Chai et al. |
| 2015/0189438 A1 | 7/2015 | Hampiholi |
| 2015/0193193 A1 | 7/2015 | Khaira |
| 2015/0195641 A1 | 7/2015 | Di Censo |
| 2015/0222987 A1 | 8/2015 | Angel, Jr. |
| 2015/0264131 A1 | 9/2015 | Goldstein |
| 2016/0035341 A1 | 2/2016 | Magrath |
| 2016/0088032 A1 | 3/2016 | Corbin et al. |
| 2016/0132031 A1 | 5/2016 | Kozura |
| 2016/0163311 A1 | 6/2016 | Crook |
| 2016/0189232 A1 | 6/2016 | Meyer et al. |
| 2016/0189513 A1 | 6/2016 | Sloo |
| 2016/0195856 A1 | 7/2016 | Spero |
| 2016/0224314 A1 | 8/2016 | Vega-Zayas |
| 2016/0284206 A1 | 9/2016 | Boettcher |
| 2016/0291924 A1 | 10/2016 | Bierbower et al. |
| 2016/0294484 A1 | 10/2016 | Hiscock et al. |
| 2016/0299736 A1 | 10/2016 | Bates et al. |
| 2016/0343227 A1 | 11/2016 | Shih |
| 2016/0351190 A1 | 12/2016 | Piernot |
| 2016/0353217 A1 | 12/2016 | Starobin et al. |
| 2016/0353218 A1 | 12/2016 | Starobin |
| 2016/0373909 A1 | 12/2016 | Rasmussen |
| 2017/0048280 A1 | 2/2017 | Logue |
| 2017/0171678 A1 | 2/2017 | Starobin et al. |
| 2017/0223394 A1 | 8/2017 | Gavade et al. |
| 2017/0242653 A1 | 8/2017 | Lang et al. |
| 2017/0243576 A1 | 8/2017 | Millington et al. |
| 2017/0278514 A1 | 9/2017 | Mathias et al. |
| 2017/0359626 A1 | 12/2017 | Chen |
| 2018/0054504 A1 | 2/2018 | Hart et al. |
| 2018/0166072 A1 | 6/2018 | Seksenov |
| 2018/0197543 A1 | 7/2018 | Gruenstein |
| 2018/0233136 A1 | 8/2018 | Torok et al. |
| 2018/0233137 A1 | 8/2018 | Torok et al. |
| 2018/0233147 A1 | 8/2018 | Tukka et al. |
| 2018/0286391 A1 | 10/2018 | Carey et al. |
| 2018/0321897 A1 | 11/2018 | Bierbower et al. |
| 2018/0336275 A1 | 11/2018 | Graham et al. |
| 2018/0358000 A1 | 12/2018 | Amid |
| 2018/0367483 A1 | 12/2018 | Rodriguez et al. |
| 2018/0367484 A1 | 12/2018 | Rodriguez et al. |
| 2018/0373494 A1 | 12/2018 | Loughrey |
| 2019/0087500 A1 | 3/2019 | Danyluk et al. |
| 2019/0180742 A1 | 6/2019 | Kothari |
| 2019/0180757 A1 | 6/2019 | Kothari |
| 2019/0295544 A1 | 9/2019 | Garcia |
| 2020/0301661 A1 | 9/2020 | Pasko |
| 2021/0035552 A1 | 2/2021 | Grizzel |
| 2021/0050008 A1 | 2/2021 | Ward |
| 2021/0132926 A1 | 5/2021 | Wangikar |

FOREIGN PATENT DOCUMENTS

| | | |
|---|---|---|
| EP | 1818930 A1 | 8/2007 |
| EP | 2757510 A1 | 7/2014 |
| GB | 2558066 A | 7/2018 |
| JP | 2018045460 A | 3/2018 |

\* cited by examiner

MULTI-ZONE MEDIA SYSTEM AND METHOD FOR PROVIDING MULTI-ZONE MEDIA

CROSS-REFERENCE TO RELATED APPLICATIONS/INCORPORATION BY REFERENCE

The present application is a continuation of U.S. patent application Ser. No. 17/370,018, filed Jul. 8, 2021, which is a continuation of U.S. patent application Ser. No. 16/997, 075, filed Aug. 19, 2020, now U.S. Pat. No. 11,082,785, which is a continuation of U.S. patent application Ser. No. 16/735,753, filed Jan. 7, 2020, now U.S. Pat. No. 10,798, 505, which is a continuation of U.S. patent application Ser. No. 15/894,591, filed Feb. 12, 2018, now U.S. Pat. No. 10,567,893, which is a continuation of U.S. patent application Ser. No. 15/445,291, filed Feb. 28, 2017, now U.S. Pat. No. 9,894,451 issued on Feb. 13, 2018, which is a continuation of U.S. patent application Ser. No. 14/725,904, filed May 29, 2015, now U.S. Pat. No. 9,584,935 issued on Feb. 28, 2017, which is related to U.S. application Ser. No. 14/726,019, filed May 29, 2015, titled "System and Method for Providing User Location-based Multi-zone Media." Each of the above-referenced applications is hereby incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Present systems and methods for presenting audio, for example presenting audio to a user as the user moves throughout a premises, are inadequate. Further limitations and disadvantages of conventional and traditional approaches will become apparent to one of skill in the art, through comparison of such approaches with the present disclosure as set forth in the remainder of the present application with reference to the drawings.

BRIEF DESCRIPTION OF SEVERAL VIEWS OF THE DRAWINGS

The accompanying drawings are included to provide a further understanding of the present disclosure, and are incorporated in and constitute a part of this specification. The drawings illustrate examples of the present disclosure and, together with the description, serve to explain various principles of the present disclosure. In the drawings.

SUMMARY

Figure 1:
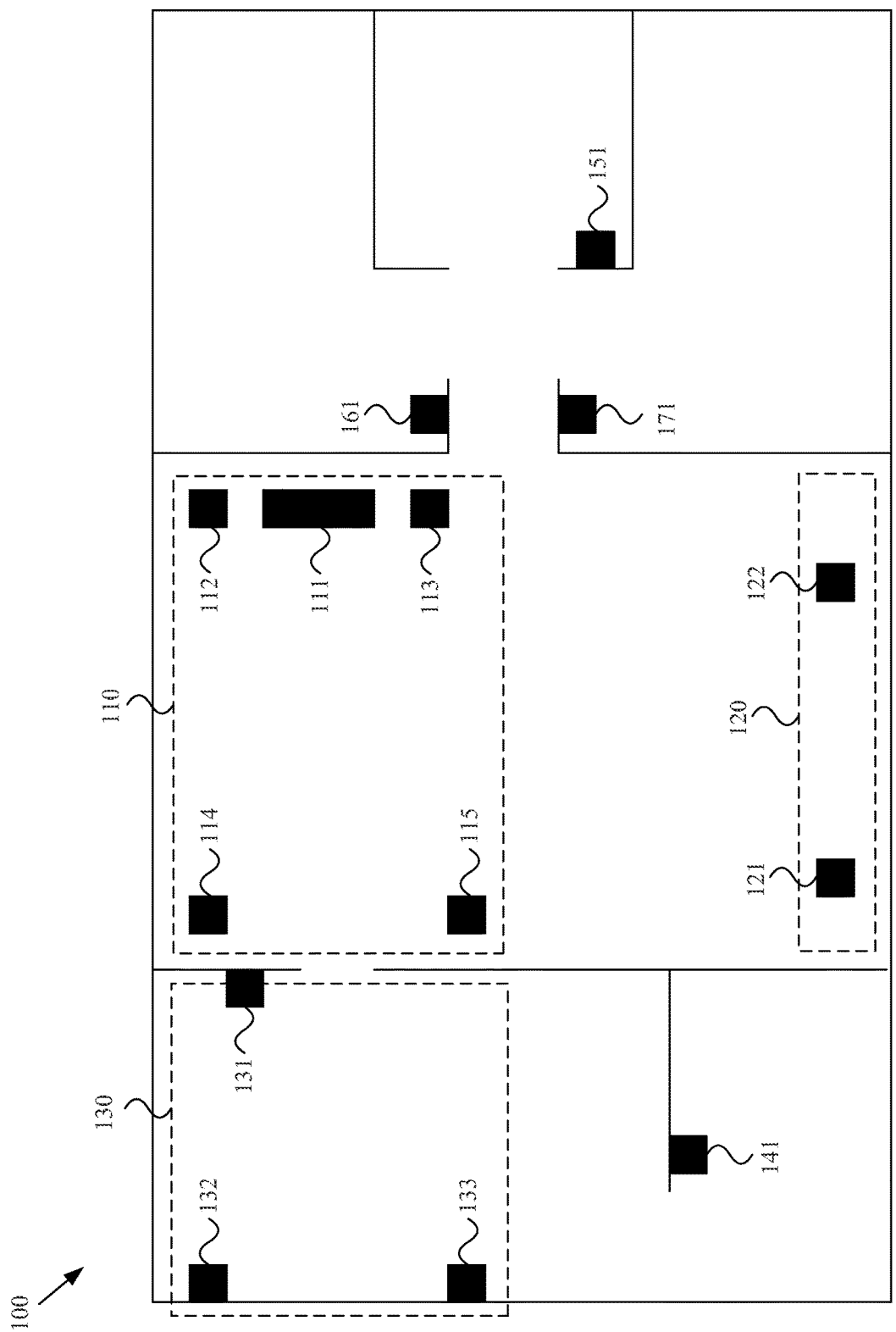
FIG. 1 is a diagram of an example multi-zone media environment, in accordance with various aspects of the present disclosure.

Various aspects of this disclosure provide a multi-zone media system and method for providing multi-zone media. As a non-limiting example, various aspects of this disclosure provide a system and method that flexibly presents media content (e.g., audio content) to a user as the user moves throughout a premises.

DETAILED DESCRIPTION OF VARIOUS ASPECTS OF THE DISCLOSURE

The following discussion presents various aspects of the present disclosure by providing various examples thereof. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. Similarly, the term "module" may be utilized herein to refer to a pure hardware module and/or a hybrid hardware/software module (e.g., a processor that operates in accordance with software instructions stored in a memory or other non-transitory medium).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "has," "comprising," "including," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a device may be turned sideways so that its "top" surface is facing horizontally and its "side" surface is facing vertically, without departing from the teachings of the present disclosure.

Various aspects of the present disclosure comprise a multi-zone media system and method for providing multi-zone media. For example, various aspects of this disclosure provide a system and method that flexibly presents media content (e.g., audio content) to a user as the user moves throughout a premises.

The above and other aspects of the present disclosure will be described in or be apparent from the following description of various example implementations.

FIG. 1 is a diagram of an example multi-zone media environment 100, in accordance with various aspects of the present disclosure.

The example environment 100 comprises a variety of loudspeakers and groups thereof, spaced throughout an example premises (e.g., a home, office, campus, etc.). A campus implementation may, for example, include outdoor areas as well as indoor areas associated with one or more buildings. The discussion of various examples herein will often refer to the example environment 100. Though the example environment 100 is generally presented in the context of audio media presentation, it should be understood that the example environment 100 and all examples presented herein readily extend to the presentation of other forms of media (e.g., video media). The example environment 100 may, for example, comprise a first group of loudspeakers 110, which may also be referred to herein as a zone. The first group of loudspeakers 110 may, for example, correspond to a first area (or audio zone) of a premises, for example a family room, media room, etc. The first group of loudspeakers 110 may, for example, comprise a central media controller 111. The central media controller 111 may comprise characteristics of any of a variety of central media controllers (e.g., an entertainment center, audio receiver, home media hub, home audio server, general purpose computer operating in accordance with software instructions, an Internet media access point or content server, etc.). The central media controller 111 may generally, for example, manage the presentation of media content throughout the example environment 100. Though the example environment 100 is generally shown and discussed as having a central media controller 111, it should be understood that the environment 100 may also operate in a mesh-type or decentralized configuration. For example, as will be discussed herein, any of the media presentation devices (e.g., loudspeakers, etc.) discussed herein may perform any or all of the control functionality discussed herein.

The first group of loudspeakers 110 may also, for example, comprise a first (e.g., front left) loudspeaker 112, a second (e.g., front right) loudspeaker 113, a third (e.g., rear right) loudspeaker 114, and a fourth (e.g., rear left) loudspeaker 115. The central media controller 111 may also, for example, comprise a loudspeaker. Each of the first group of loudspeakers 110 may, for example, be operated independently or may be operated as a single group. Each of the first group of loudspeakers 110 may, for example, operate under the control of the central media controller 111 and/or operate autonomously. Note that the designations of the loudspeakers as left, right, front, rear, center, etc. may, but need not, refer to audio spatial arrangements generally synonymous with various loudspeaker arrangements (e.g., stereo, surround sound, monaural, etc.).

The example environment 100 may also, for example, comprise a second group of loudspeakers 120. The second group of loudspeakers 120 may, for example, comprise a first (e.g., right) loudspeaker 121 and a second (e.g., left) loudspeaker 122. The second group of loudspeakers 120 may, for example, correspond to a second area of a premises, for example a kitchen or dining room, a break room, etc. Each of the second group of loudspeakers 120 may, for example, be operated independently or may be operated as a single group. Each of the second group of loudspeakers 120 may, for example, operate under the control of the central media controller 111 and/or operate autonomously. Also for example, any or all of the second group of loudspeakers 120 may operate with any or all of the other loudspeakers in the environment 100.

The example environment 100 may additionally, for example, comprise a third group of loudspeakers 130. The third group of loudspeakers 130 may, for example, comprise a first (e.g., central) loudspeaker 131, a second (e.g., right) loudspeaker 132, and a third (e.g., left) loudspeaker 133. The third group of loudspeakers 130 may, for example, correspond to a third area of a premises, for example a master bedroom, garage, shop, etc. Each of the third group of loudspeakers 130 may, for example, be operated independently or may be operated as a single group. Each of the third group of loudspeakers 130 may, for example, operate under the control of the central media controller 111 and/or operate autonomously. Also for example, any or all of the third group of loudspeakers 130 may operate with any or all of the other loudspeakers in the environment 100.

The example environment 100 may further, for example, comprise a loudspeaker 141 in a fourth area (or room or zone) (e.g., in a master bath), a loudspeaker 151 in a fifth area (e.g., in a guest bath), a loudspeaker 161 in a sixth area (e.g., in a guest room), and a loudspeaker 171 in a seventh area (e.g., in an office).

Figure 2:
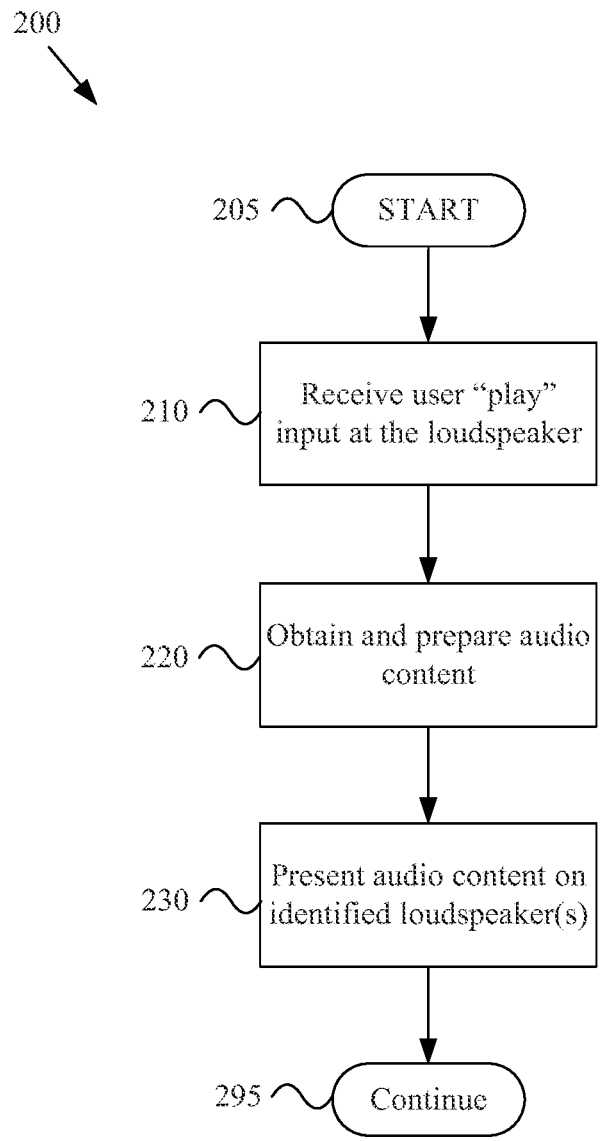
FIG. 2 is a flow diagram of an example method for providing multi-zone media, in accordance with various aspects of the present disclosure.

Referring next to FIG. 2, such figure is a flow diagram of an example method 200 for providing multi-zone media, in accordance with various aspects of the present disclosure. The example method 200 may, for example, share any or all characteristics with the other methods discussed herein (e.g., with regard to FIGS. 3 and 4). The example method 200, or any portion thereof, may be implemented at a loudspeaker, a central media controller, a plurality of system components, etc.

The example method 200 begins executing at block 205. The example method 200 may begin executing in response to any of a variety of causes or conditions. The method 200 may, for example, begin executing when a media presentation system implementing the method 200 is powered up, reset, or turned on. The method 200 may also, for example, begin executing when a media presentation system implementing the method 200 receives a command from a user to present audio content and/or to present audio content in a manner that permits the user to flexibly play or transfer music to various zones (e.g., receiving a command directly at the system, receiving a command from a remote controller, receiving a command from a user's smart phone, etc.). The method 200 may further, for example, begin executing in response to the media presentation system (e.g., a controller, loudspeaker, etc.) exiting from a sleep mode. Also for example, the method 200 may begin executing in response to detecting a user input (e.g., a touch command, a voice command, etc.) at a component of the media presentation system (e.g., at a loudspeaker, at a controller, at a sensor independent of a loudspeaker or controller, etc.). Additionally, for example, the method 200 may begin executing in response to detecting a user input at a sensor physically independent of yet communicatively coupled to a media presentation system or a component thereof, etc.). Still further for example, block 205 may receive execution flow from any of the blocks of the example method 200 and/or from any flow diagram block discussed herein (e.g., at FIGS. 3 and 4). In general, the method 200 may begin executing in response to any of a variety of causes or conditions. Accordingly, the scope of this disclosure should not be limited by characteristics of any particular initiating cause or condition.

The example method 200 may, at block 210, comprise receiving a user "play" input at a loudspeaker. Block 210 may comprise receiving the user "play" input in any of a variety of manners, non-limiting examples of which will now be presented.

For example, block 210 may comprise receiving a user touch (or tactile) input at the loudspeaker. Such a touch input may, for example, occur at a touch pad or other sensor of a loudspeaker. For example, a loudspeaker may comprise one or more touch sensors at one or more locations of the loudspeaker enclosure with which a user touch input may be detected or received. Also for example, such a touch input may, for example, be received at an enclosure of the loudspeaker. For example, the enclosure may comprise touch-sensitive material embedded within the enclosure (e.g., piezo-resistive and/or piezo-electric material, capacitive touch-sensing structure, etc.). Additionally for example, such a touch input may be detected by a sensor that detects a user's hand close enough to the loudspeaker to be deemed a touch (e.g., with a proximity sensor, light sensor, heat sensor, etc.).

Also for example, block 210 may comprise receiving a user touch (or tactile) input at a sensor that is physically separate from but communicatively coupled to the loudspeaker or other audio system component. For example, a touch sensor may be incorporated into a switch plate, a door, a door frame, or some other location that is convenient for a user to access. For example, rather than walk to a loudspeaker in a room to provide a "play" input, the user may provide the "play" input at a switch plate, a sensor mounted to a door frame or jamb, a sensor mounted to a wall just inside a door to a room, etc.

The "play" input may also, for example, comprise an audible input (e.g., a voice command to "play," a clap or clap sequence, etc.). For example, block 210 may comprise receiving an audible command at a loudspeaker and/or a microphone of a loudspeaker. Block 210 may, for example, comprise identifying user commands by utilizing voice recognition technology. Note that in an example implementation that includes a loudspeaker, a same loudspeaker may be utilized as both a loudspeaker and as a microphone. Such operation as both a loudspeaker and as a microphone may be performed in a time-duplexed manner, for example serially alternating between functioning as a loudspeaker and as a microphone. Such operation may also be performed in parallel. For example, even when a loudspeaker is being utilized to output sound, the loudspeaker is also sensitive to sound inputs, which can separated from the output sound and analyzed as a sound input. As with the touch input, the audible input may be received or detected by a sensor that is physically separate from but communicatively coupled to the loudspeaker or other audio system component.

In general, block 210 may comprise receiving a user "play" input (e.g., at a loudspeaker). Accordingly, the scope of various aspects of this disclosure should not be limited by characteristics of any particular user "play" input or any particular manner of receiving such an input.

The method 200 may, at block 220, comprise (e.g., at least in part in response to the "play" input received at block 210) obtaining and preparing audio content for presentation. Block 220 may, for example, comprise defining and/or establishing a communication link with an audio content server (e.g., local to a premises, remote from the premises, etc.), a central media controller, another loudspeaker, etc. The communication link may, for example, be wired and/or wireless. Establishing the communication link may, for example, comprise joining a multicast group that comprises a plurality of members all receiving the audio content. Also for example, establishing the communication link may comprise establishing a unicast communication link for receiving the audio content. The communication link may, for example, be performed in accordance with any of a variety of standard and/or proprietary communication protocols.

Block 220 may, for example, comprise receiving audio content over a communication link. The audio content may comprise any of a variety of characteristics, for example encoded in accordance with any of a variety of encoding formats. Block 220 may comprise decoding, error correcting, and/or otherwise processing or preparing the received audio content for presentation.

Block 220 may also, for example, comprise synchronizing the audio content to be presented at step 230 to other presentations of the audio content presently occurring (e.g., in different audio presentation zones). For example, the received audio content (e.g., in the form of data packets) may comprise timestamp information (e.g., a presentation timestamp) indicative of the intended presentation time of the audio content. Block 220 may thus ensure that the audio content is presented synchronously.

Note that any or all aspects of block 220 may be performed prior to receiving the "play" input at block 210 (e.g., in anticipation of and/or in preparation for receiving the "play" input). For example, the functionality of block 220 may be performed in anticipation of the user "play" input being received at block 210. Such preprocessing may, for example, eliminate latency between receiving the input at block 210 and presentation of the content at block 230. Such preprocessing may, for example, be performed at all loudspeakers or controllers in a premises or at a selected one or more loudspeakers or controllers. Such operation is discussed herein, for example in the discussion of FIG. 4.

As part of the obtaining and preparing, block 220 may comprise identifying one or more other loudspeakers for presentation of the audio content (e.g., for immediate presentation and/or for anticipated presentation). If one or more other loudspeakers are identified, block 220 may comprise communicating with such identified loudspeakers regarding the received "play" input and/or the audio content. For example, in an example scenario in which a user is in an audio zone that is serviced by the third group of loudspeakers 130 of FIG. 1, block 210 may comprise receiving the user "play" input at the first loudspeaker 131, and block 220 may comprise communicating with the second loudspeaker 132 and the third loudspeaker 133 regarding the received "play" input and/or the audio content. Note that such communication may be direct and/or indirect (e.g., through the central media controller 111). In such example scenario, when the time comes to present the audio content, all of the loudspeakers of the group may operate together as a cohesive group. In another example scenario in which a user enters the seventh area, which is service by a single loudspeaker 171, block 210 may comprise receiving the user "play" input at the loudspeaker 171, and block 220 may comprise identifying the loudspeaker 171 as the only loudspeaker for which audio needs to be obtained and prepared. In another example scenario, block 220 may comprise identifying all loudspeakers within a particular distance of a loudspeaker at which a user "play" input is received.

Block 220 may also, for example, comprise determining or selecting audio presentation characteristics for the audio content. For example, there may be a default volume and/or equalization for audio presentation for all loudspeakers, all loudspeakers of a group, or each individual loudspeaker. In such a scenario, block 220 may simply identify the default characteristics.

Also for example, block 220 may comprise retrieving the most recent audio presentation characteristics from memory (e.g., local or remote memory). For example, each loudspeaker may maintain a record of the most recent volume, equalization characteristics, etc., and then select such audio presentation characteristics for the next presented audio.

Additionally, for example, block 220 may comprise receiving the audio presentation characteristics from a central media controller and/or from other loudspeakers already playing the audio content. For example, if the audio content is already being played by one or more other loudspeakers, step 220 may comprise determining the audio presentation characteristics for the audio content that is already being played, and matching such audio presentation characteristics. In such a manner, the audio presentation characteristics (e.g., volume, equalization or magnitude response shape, spatialization, limiting, any of a variety of digital signal processing effects associated with audio content, etc.) can be synchronized or coordinated over multiple groups of loudspeakers or audio presentation zones of the premises. For example, if a user turns up the volume of a favorite song in a first area of the home serviced by a first group of loudspeakers, when the system continues to present the audio in a next area of the home (e.g., triggered by a user "play" input received at a loudspeaker in that next area), the system may continue to present the audio at the increased volume.

Additionally for example, block 220 may comprise determining (e.g., retrieving from memory) audio presentation characteristics associated with a particular user that is utilizing the system. For example, a user profile may be maintained for audio presentation for that user. When the particular user is utilizing the system, the system may present audio content for the user in accordance with the user profile. For example, block 220 may comprise determining a first volume for content being presented to a first user, and a second volume for content being presented to a second user. User identification may be determined in any of a variety of manners (e.g., by user tactile input and/or recognition, user voice input and/or recognition, identification of user electronic signature, by a user input explicitly identifying the user, etc.).

In general, block 220 may comprise obtaining and preparing audio content for presentation. Accordingly, the scope of various aspects of this disclosure should not be limited by characteristics of any particular manner of obtaining and preparing audio content.

The example method 200 may, at block 230, comprise presenting the audio content. For example, block 230 may comprise generating and communicating signals to loudspeaker amplifier circuitry that cause one or more loudspeakers to output the audio content. As discussed herein, for example with regard to block 220, the loudspeakers and/or audio presentation characteristics may be selected for playing the audio content. Block 230 may thus comprise presenting the audio content at the selected loudspeakers and having the selected audio presentation characteristics. Block 230 may, for example, comprise generating and communicating signals having the necessary frequency content, amplitude, timing, etc.

The example method 200 continues execution at block 295. The continued execution may comprise any of a variety of characteristics. For example, block 295 may comprise looping execution flow back up to any of the previous blocks of the example method 200 and/or to any flow diagram block discussed herein.

Figure 3:
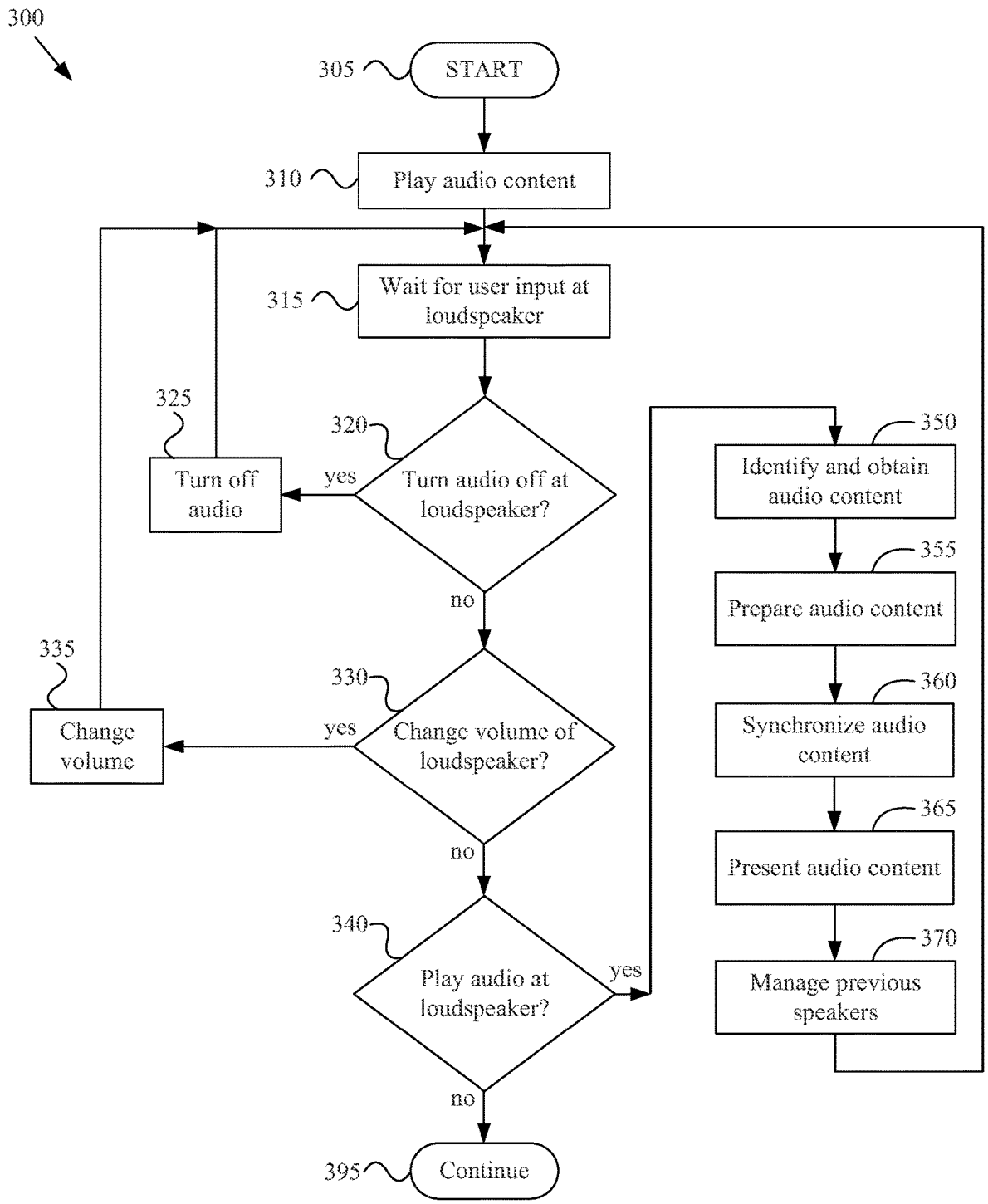
FIG. 3 is a flow diagram of another example method for providing multi-zone media, in accordance with various aspects of the present disclosure.

Turning next to FIG. 3, such figure shows a flow diagram of another example method 300 for providing multi-zone media, in accordance with various aspects of the present disclosure. The example method 300 may, for example, share any or all characteristics with the other methods discussed herein (e.g., with regard to the methods 200 and 400 of FIGS. 2 and 4). The example method 300, or any portion thereof, may for example be implemented at a loudspeaker, a central media controller, distributed among a plurality of system components, etc.

The example method 300 begins executing at block 305. The example method 300 may begin executing in response to any of a variety of causes or conditions. The method 300 may, for example, begin executing when a media presentation system implementing the method 300 is powered up, reset, or turned on. The method 300 may also, for example, begin executing when a media presentation system implementing the method 300 receives a command from the user to present audio content and/or to present audio content in a manner that permits the user to flexibly play or transfer music to various zones (e.g., receiving a command directly at the system, receiving a command from a remote controller, receiving a command from a user's smart phone, etc.). The method 300 may further, for example, begin executing in response to the media presentation system (e.g., a controller, loudspeaker, etc.) exiting from a sleep mode. Also for example, the method 300 may begin executing in response to detecting a user input (e.g., a touch command, a voice command, etc.) at a component of the media presentation system (e.g., at a loudspeaker, at a controller, at a sensor independent of a loudspeaker or controller, etc.). Additionally, for example, the method 300 may begin executing in response to detecting a user input at a sensor physically independent of yet communicatively coupled to a media presentation system or a component thereof, etc.). Still further for example, block 305 may receive execution flow from any of the blocks of the example method 300 and/or from any flow diagram block discussed herein (e.g., at FIGS. 2 and 4). In general, the method 300 may begin executing in response to any of a variety of causes or conditions. Accordingly, the scope of this disclosure should not be limited by characteristics of any particular initiating cause or condition.

The example method 300 may, at block 310, comprise playing audio content. Block 310 may, for example, comprise playing audio content at a loudspeaker implementing the method 300 or a portion of the method 300. Block 310 may also, for example, comprise playing the audio content at a loudspeaker different from the loudspeaker implementing the method 300 or a portion of the method 300. Block 310 may, for example, share any or all characteristics with block 230 of the example method 200 shown at FIG. 2 and discussed herein.

The example method 300 may, at block 315, comprise waiting for a user input at a loudspeaker. Block 315 may, for example, share any or all characteristics with block 210 of the example method 200 shown in FIG. 2 and discussed herein.

Block 315 may, for example, comprise waiting for a user input while operating in a reduced power mode (e.g., a sleep mode), for example in which some or most electrical components of a loudspeaker are powered off or down. For example, while waiting for a user input, a system implementing block 315 might only keep enough electrical circuitry active to detect a user input. A detected user input may then, for example, result in exiting the reduced power mode. A loudspeaker may, for example, operate in a sleep mode when not presenting and/or expecting to present audio content.

Also for example, block 315 may comprise waiting for a user input while operating the loudspeaker in an awake mode. For example, the loudspeaker may always be awake or may, for example, be awake in response to a signal (e.g., from a central media controller, other loudspeaker, sensor, etc.) indicating that a user input is imminent or likely. In such a scenario, as discussed herein, the loudspeaker may also obtain and/or process audio content in anticipation of a user input (e.g., a "play" input) being received. In another example, the loudspeaker may be operating in an awake mode because it is presently playing audio content.

As discussed herein, the user input may comprise a touch or tactile input, audible or voice input, etc. The user input may also be received at a sensor of a loudspeaker and/or at a sensor that is physically separate from the loudspeaker.

The example method 200 discussed herein with regard to FIG. 2 generally addressed receiving one type of input (e.g., a "play" input). The scope of this disclosure is not, however, limited to a single type of input. For example, the received input may comprise a "play" command, a "stop" command, a "volume up" or "volume down" command, a "bass/treble" or other equalization command, a command to remember current audio presentation settings, etc.

For example, at flow control block 320, a decision is made whether a received user input is a command to turn off audio presentation at the loudspeaker. If so, execution flow of the example method 300 proceeds to block 325 at which the audio output from the loudspeaker is turned off and execution flow of the example method 300 returns to block 315. If, however, the received user input is not a command to turn off audio presentation at the loudspeaker, execution flow of the example method 300 may proceed to another flow control block 330. In an example scenario and referring to FIG. 1, if the loudspeaker 161 in the sixth audio zone is playing audio content, a person leaving the sixth zone may provide an input to the loudspeaker 161 (or an associated sensor) indicating that the loudspeaker 161 is to stop playing the audio content.

In an example implementation, a single touch may signify "play" if the loudspeaker is silent and signify "stop playing" if the loudspeaker is playing. Also for example, a single touch or first touch sequence may signify "play" while a double touch or second touch sequence may signify "stop playing." Additionally for example, verbal commands such as the user saying "play" or "follow" may signify a command to play, while verbal commands such as "stop" or "silence" may signify a command to stop playing. Other audible inputs, such as a clap or clap sequence, may be utilized to represent commands as well.

At flow control block 330, a decision is made whether a received user input is a "volume change" command (e.g., volume up or volume down). If so, execution flow of the example method 300 proceeds to block 335 to implement the commanded volume change. As an example, referring to block 220 of the example method 200 of FIG. 2, the amplitude of a signal being provided to drive an audio loudspeaker may be adjusted to implement the commanded volume change. If, however, the received user input is not a command for a volume change, execution flow of the example method 300 may proceed to another flow control block 340.

In an example scenario and referring to FIG. 1, if the loudspeaker 171 in the seventh audio zone is playing audio content and a user input command to turn down the volume is received (e.g., at the loudspeaker 171, at an associated sensor, etc.), then block 335 will turn down the volume accordingly. In another example scenario, if a "volume up" input is received at the loudspeaker 122 in the second area 120 or audio zone, block 335 may turn down the volume of both of the loudspeakers 121 and 122 of the second area 120. In this example, a command (e.g., play/stop, volume up/down, bass/treble adjust, etc.) at either of the loudspeakers 121 and 122 may result in the desired audio presentation change being implemented in both of the loudspeakers 121 and 122 of the second area 120.

An input volume change command (or command to change other media presentation characteristics) may comprise any of a variety of characteristics. For example, a volume change command may be received as a finger swipe up or down on a loudspeaker enclosure, sensor mounted to the loudspeaker enclosure, a sensor that is physically separate but associated with the loudspeaker, etc.

At the flow control block 340, if the received user input is a command to play the audio content at the loudspeaker, then execution flow of the example method 300 may proceed to block 350. If, however, the received input is not a command to play the audio content at the loudspeaker, then execution flow of the example method 300 may proceed to block 345 for continued execution.

At block 350, audio content to be played may be identified and/or obtained. Block 350 may, for example, share any or all characteristics with block 220 of the example method 200 shown in FIG. 2 and discussed herein.

Block 350 may, for example, comprise identifying audio to be played. In an operating mode in which audio content is to follow a user around a premise (e.g., as requested by the user when the user enters an audio zone or area), block 350 may comprise identifying the audio content to be the audio content that is or has already recently been playing in other areas. In a scenario in which no audio is currently being presented in the premises, block 350 may comprise identifying most recently presented audio content (e.g., a channel or other source, a song, a playlist, an artist, a recorded broadcast or show, etc.). In another example scenario, the system may be configured (e.g., with an app) to play particular audio content when a user input "play" command is received. Such configuring may, for example, be performed locally (e.g., within a local area network) or remotely (e.g., via the Internet or a wide area network). In yet another example, block 350 may comprise identifying a networked radio station (e.g., Pandora™, Rhapsody™, etc.) and interfacing with the networked station to provide audio for the identified user and/or identified premises.

Block 350 may also comprise obtaining the identified audio content to be presented. For example, as explained herein block 350 may comprise joining a multicast group to which the audio content is already being communicated. Also for example, block 350 may comprise interfacing with a central media controller or audio content server to obtain the identified audio content.

After the desired audio content is obtained, block 355 may comprise preparing the audio content for presentation. For example, as discussed previously (e.g., with regard to block 220 of the example method 200 shown in FIG. 2), block 355 may comprise processing audio content in any of a variety of manners (e.g., decoding audio data, error-correcting audio data, adjusting volume and/or equalization of audio data, etc.).

At block 365, the audio content to be presented may be synchronized, for example synchronized to audio content already being presented. For example, as discussed previously (e.g., with regard to block 220 of the example method 200 shown in FIG. 2), block 365 may comprise synchronizing audio presentation based on timestamps in the obtained audio content (e.g., presentation timestamps). Block 365 may also, for example, include synchronizing a local clock (e.g., at a loudspeaker) with a central clock (e.g., at a central control, content server, etc.). In various example implementations, the presentation of audio content from different loudspeakers may be timed or synchronized to reach a user at the same time. For example, the audio content presented from a relatively near speaker may be delayed relative to the audio content presented from a relatively far speaker so that the audio content from both the near speaker and the far speaker reach the user at the same time. Such operation may, for example, be advantageous when the audio content is only being directed to one user, or more generally to one audio zone.

Note that blocks 350, 355, and 360 may share any or all characteristics with the block 220 of the example method 200 shown in FIG. 2 and discussed herein. Also note that, as discussed herein with regard to block 220 of FIG. 2, the functionality of blocks 350, 355, and 360 may be performed prior to a "play" input being received at block 315. In other words, obtaining audio content, processing audio content, and synchronizing audio content may be performed in anticipation of the need for actually playing the audio content in response to a user input received at block 315.

Block 365 may, for example, comprise presenting the audio content to the user. Block 365 may, for example, share any or all characteristics with block 230 of the example method 200 illustrated in FIG. 2 and discussed herein.

Block 370 may, for example, comprise managing the presentation of the audio content by loudspeakers that have already been playing the audio content. For example, upon playing audio content at a current loudspeaker (or logically grouped set of loudspeakers), block 370 may stop presentation of the audio content at a previous loudspeaker or group thereof.

For example, referring to FIG. 1, in an example scenario, a user may leave the first area 110 (or audio zone) in which audio is being presented and provide a user input at the loudspeaker 151 in the fifth area to command the audio content to be played by the loudspeaker 151. Block 315 may wait for and receive the user input, blocks 350-365 may play the audio content at loudspeaker 151, and block 370 may stop presentation of the audio content in the first area 110 (e.g., stopping presentation of the audio content by the loudspeakers 112-115 of the first area). Such stopping may, for example, be performed immediately, may be performed after a time delay, may be performed after a time delay without another user input at a loudspeaker or sensor of the first area 110, etc. Such stopping may, for example, comprise an abrupt stoppage or may comprise a fading out.

In another example scenario, the audio presentation may be maintained in a most recent area but discontinued in a second most recent area. For example referring again to FIG. 1, in an example scenario in which a user input causes the audio content to be presented in the third area 130 (or loudspeakers therein), and then in the first area 110, and then in the second area 120, block 370 may discontinue presentation of the audio content in the third area 130 when the audio content begins to be presented in the second area 120. For example, upon presentation of the audio content by the loudspeakers 121 and 122 of the second area 120, presentation of the audio content by the loudspeakers 112-115 of the first area 110 will continue, while presentation of the audio content by the loudspeakers 131-133 of the third area 130 will be stopped. A moving window of audio content presentation may thus follow the user, so that the user need not reinitiate audio presentation when returning to a zone from which the user just came.

After block 370 manages the presentation of the audio content in loudspeakers that have previously been playing the audio content, execution flow of the example method 300 may return to block 315 to wait for another user input.

As mentioned herein, if the received input is not a command to play the audio content at the loudspeaker, then execution flow of the example method 300 may proceed from flow control block 340 to block 395 for continued execution. The continued execution may comprise any of a variety of characteristics. The continued execution may, for example, comprise further identification of the user input and performing the desired function. Block 395 may, for example, comprise looping execution flow back up to any of the previous blocks of the example method 300 and/or to any flow diagram block discussed herein.

Figure 4:
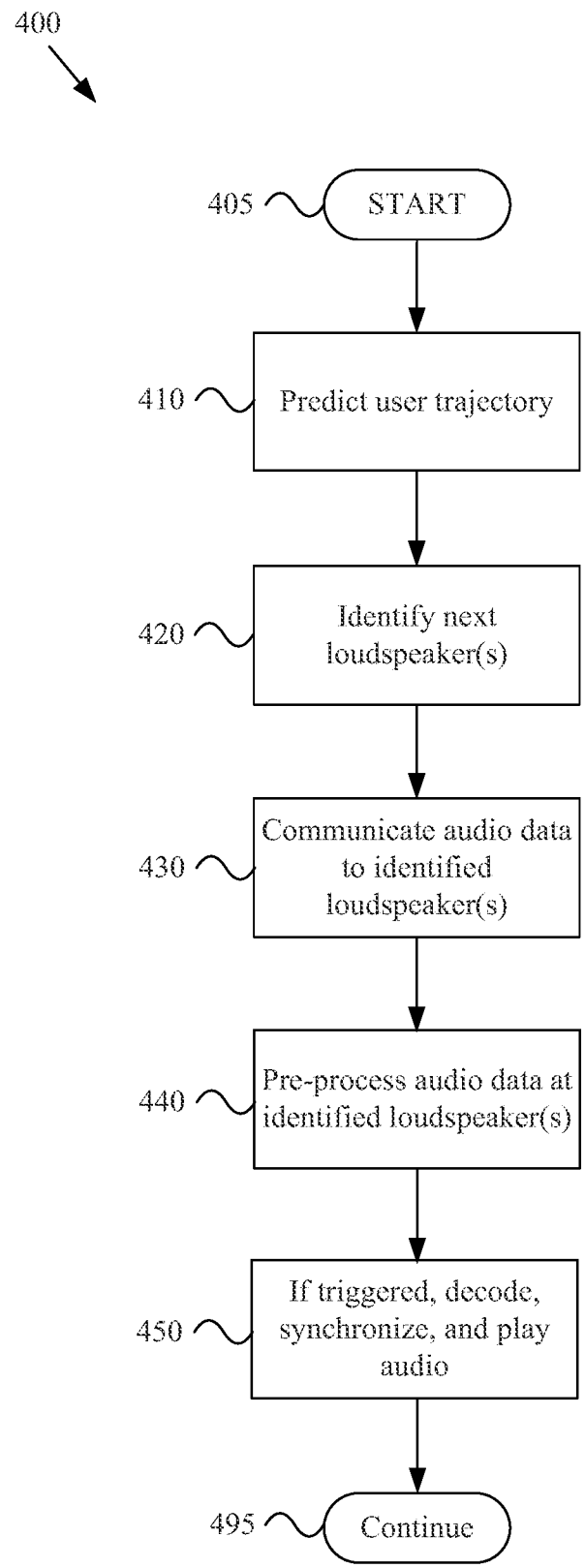
FIG. 4 is a flow diagram of an additional example method for providing multi-zone media, in accordance with various aspects of the present disclosure.

As discussed herein, audio content may be preemptively obtained and processed prior to the need for the audio content at a loudspeaker arising. Such obtaining and processing may, for example, beneficially eliminate or reduce latency in audio content presentation in response to a user command to present the audio content. Such obtaining and processing may, for example, be performed at all loudspeakers and/or other components of the media system. Alternatively, such obtaining and processing may also be performed at an identified loudspeaker or group thereof. For example, one or more loudspeakers may be identified as the most likely loudspeakers to be involved in a next presentation of the audio content. Such identified loudspeakers may then perform the preemptive obtaining and processing. FIG. 4 provides an example of such operation.

FIG. 4 is a flow diagram of an additional example method 400 for providing multi-zone media, in accordance with various aspects of the present disclosure. The example method 400 may, for example, share any or all characteristics with the other methods discussed herein. The example method 400, or any portion thereof, may be implemented at a loudspeaker, a central media controller, distributed among a plurality of system components, etc.

The example method 400 begins executing at block 405. The example method 400 may begin executing in response to any of a variety of causes or conditions. The method 400 may, for example, begin executing when a media presentation system implementing the method 400 is powered up, reset, or turned on. The method 400 may also, for example, begin executing when media presentation system implementing the method 400 receives a command from the user to present audio content and/or to present audio content in a manner that permits the user to flexibly play or transfer music to various zones (e.g., receiving a command directly at the system, receiving a command from a remote controller, receiving a command from a user's smart phone, etc.). The method 400 may further, for example, begin executing in response to the media presentation system (e.g., a controller, loudspeaker, etc.) exiting from a sleep mode. Also for example, the method 400 may begin executing in response to detecting a user input (e.g., a touch command, a voice command, etc.) at a component of the media presentation system (e.g., at a loudspeaker, at a controller, at a sensor independent of a loudspeaker or controller, etc.). Additionally, for example, the method 400 may begin executing in response to detecting a user input at a sensor physically independent of yet communicatively coupled to a media presentation system or a component thereof, etc.). Still further for example, block 405 may receive execution flow from any of the blocks of the example method 400 and/or from any flow diagram block discussed herein (e.g., at FIGS. 2 and 3). In general, the method 400 may begin executing in response to any of a variety of causes or conditions. Accordingly, the scope of this disclosure should not be limited by characteristics of any particular initiating cause or condition.

The example method 400 may, at block 410, comprise predicting a user trajectory (e.g., within the premises in which audio content is being presented to the user). Block 410 may, for example, predict a most likely next presentation area based on the presentation areas in which the audio content has been presented to the user. For example, referring to FIG. 1, if the user initiated audio presentation in the first area 110 followed by the third area 130, block 410 may predict the fourth area (e.g., including the loudspeaker 141) as a next likely point in the user trajectory. Also for example, if the user initiated audio presentation in the first area 110 followed by the second area 120, block 410 may predict that the user will likely return to the first area 110.

Block 410 may predict one or more most likely user trajectories in any of a variety of manners. For example, block 410 may comprise performing such prediction based on known monitored user movement patterns. For example, if at 6:00 pm on weekday evenings, the user habitually moves from the third area 130 to the second area 120 to the first area 110, block 410 may, for example upon determining that the time is near 6:00 pm and seeing the user initiate audio content presentation in the third area 130 and then the second area 120, determine that the user is likely to move next into the first area 110 and request audio content presentation there. In another scenario, block 410 may determine that the next most likely user trajectory includes a trajectory to any area (or audio zone) adjacent to the current area in which the audio content is being presented.

The example method 400 may, at block 420, for example based on the prediction(s) of block 410, identify a set of likely next loudspeakers to present the audio content. For example, upon prediction of a user trajectory into a next area, block 420 may identify the loudspeakers associated with audio content in the area. For example, referring to FIG. 1, identification of the first area 110 by block 410 may result in block 420 identifying the loudspeakers 112-115. Also for example, identification of the fifth, sixth, and seventh areas by block 410 may result in block 420 identifying the loudspeaker 151, loudspeaker 161, and loudspeaker 171.

The example method 400 may, for example at block 430, comprise communicating the audio content to the identified loudspeakers (e.g., in a broadcast or multicast communication, in a unicast communication to each loudspeaker, etc.). For example, block 430 may comprise establishing communication links for the communication of the audio content (e.g., bandwidth allocation, address allocation, multicast setup, etc.). Block 430 may, for example, share any or all characteristics with block 220 and block 350 of the example methods 200 and 300 shown in FIGS. 2-3 and discussed herein.

The example method 400 may, for example at block 440, comprise pre-processing audio data at the identified loudspeaker(s). Block 440 may, for example, share any or all characteristics with block 220, block 355, and block 360 of the example methods 200 and 300 shown in FIGS. 2-3 and discussed herein. As mentioned herein, the obtaining and processing of audio content may be performed prior to the determination of a present need for the audio content at a particular loudspeaker.

The example method 400 may, for example at block 450, comprise processing and playing the audio content at the identified next loudspeaker(s) if triggered (e.g., by a user input). Other examples of the general methodology presented at FIG. 4 may be found in U.S. application Ser. No. 14/726,019 filed May 29, 2015, titled "System and Method for Providing User Location-based Multi-zone Media," the contents of which are hereby incorporated herein by reference in their entirety.

Figure 5:
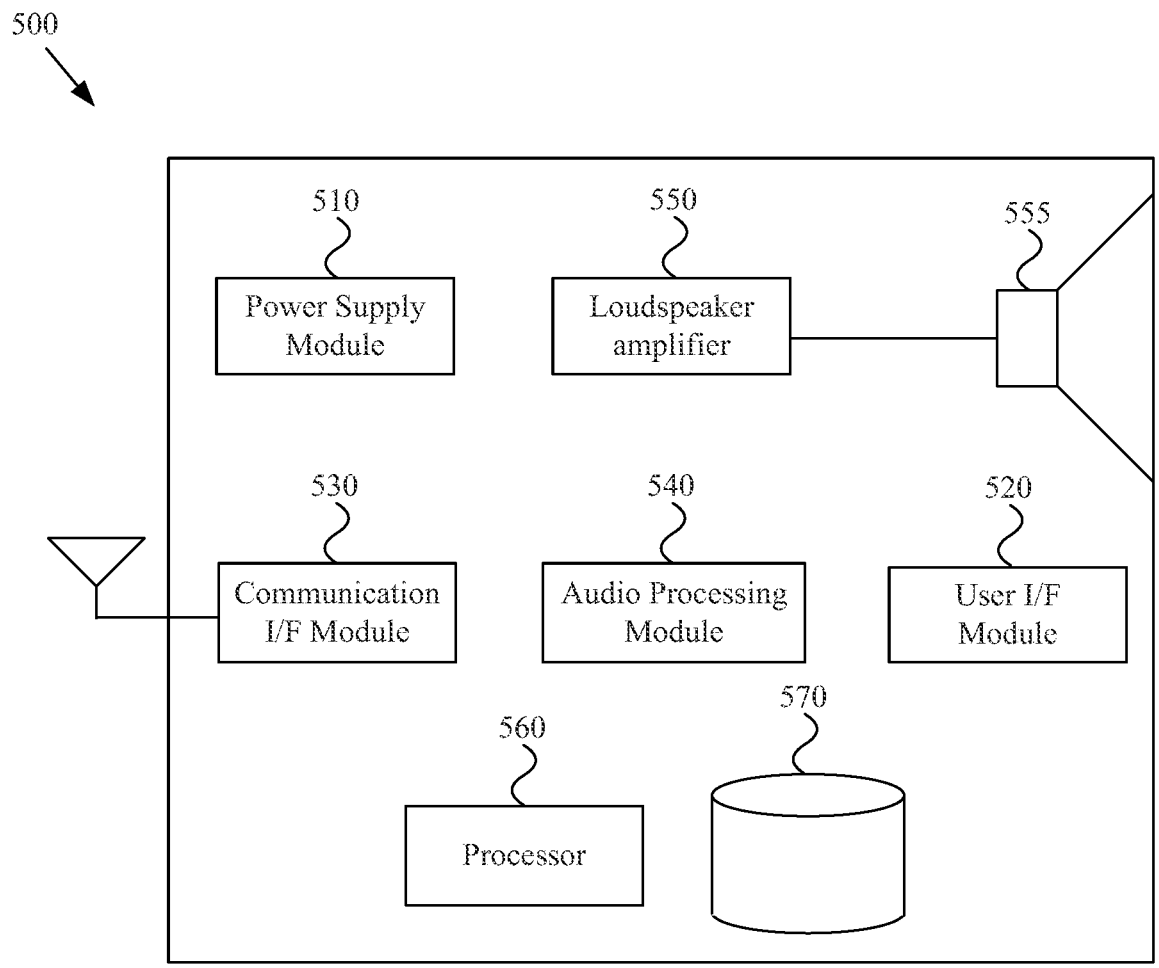
FIG. 5 is a block diagram of an example media output device, in accordance with various aspects of the present disclosure.
Figure 6:
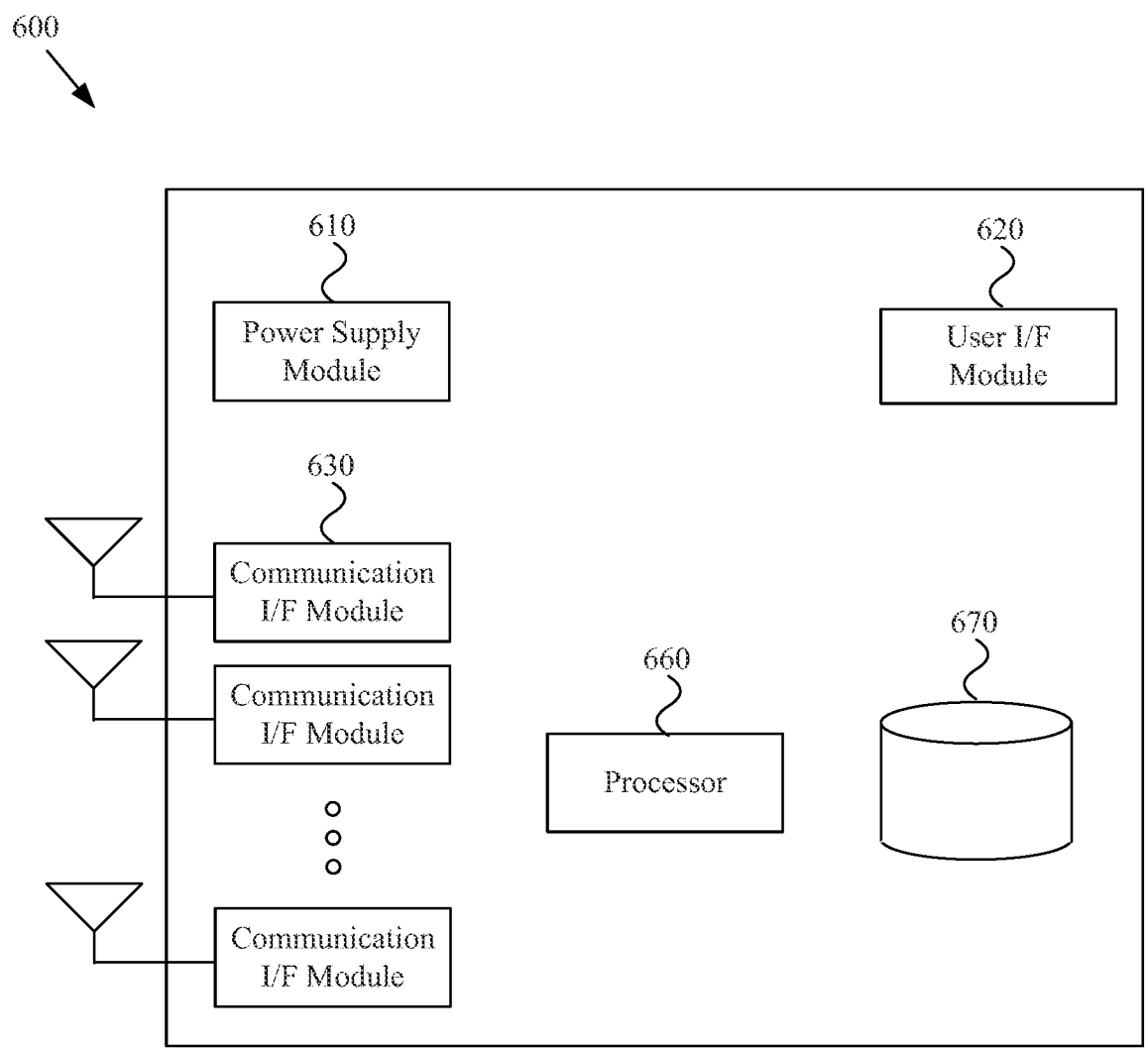
FIG. 6 is a block diagram of an example media controller, in accordance with various aspects of the present disclosure.

As explained herein, the example methods 200, 300, and 400 presented herein, or any portion thereof, may be performed by one or more loudspeakers, a central media controller, or other apparatus (e.g., independently or in a distributed manner). FIGS. 5 and 6 provide non-limiting examples of a media output device and a central media controller, each of which may perform any or all of the functionality discussed herein.

FIG. 5 is a block diagram of an example media output device 500, in accordance with various aspects of the present disclosure. The media output device 500 may, for example, operate to or be operable to perform any or all of the functionality discussed herein (e.g., with regard to the example methods illustrated in FIGS. 2-4 and discussed herein). The media output device 500 may, for example, comprise a loudspeaker, but the scope of this disclosure is not limited thereto. The loudspeaker may, for example, be wall-mounted, ceiling mounted, free-standing, indoor, outdoor, etc. The media output device 500 may, for example, comprise any of a variety of media output devices (e.g., a video output device, etc.). The media output device 500 may, for example, share any or all characteristics with the loudspeakers shown in FIG. 1.

The example device 500 may, for example, comprise a power supply module 510. The power supply module 510 may, for example, comprise electrical circuitry operable to receive and/or prepare electrical power for utilization by the other modules of the device 500. The power supply module 510 may, for example, comprise an A/C power module adapted for plugging into a premises power outlet and/or for direct integration into the A/C power system of a premises.

The power supply module 510 may also, for example, be operable to receive and/or prepare electrical power from a power-over-Ethernet (POE) system. The power supply module 510 may additionally, for example, be operable to receive and/or prepare battery power (e.g., manage battery operation for power supply, recharging, etc.). The power supply module 510 may also, for example, be operable to provide electrical power (e.g., via Ethernet or other wiring) to other media presentation devices (e.g., to other loudspeakers).

The example device 500 may also, for example, comprise a user interface module 520. The user interface module 520 may, for example, be operable to perform any or all of the user interface functionality discussed herein. For example, the user interface module 520 may be operable to perform the functionality discussed herein with regard to block 210 of the example method 200 illustrated in FIG. 2 and with regard to block 315 of the example method 300 illustrated in FIG. 3.

For example, the user interface module 520 may comprise any one or more of a variety of sensors for user input. For example, the user interface module 520 may comprise a touch sensor and associated circuitry for processing touch inputs. The touch sensor for user touch input may, for example, comprise a touch pad, touch screen, heat sensor, capacitive sensor, piezo-resistive sensor, piezo-electric sensor, light sensor, MEMS inertial sensor, etc. The touch input may, for example, comprise a tap input (e.g., single-tap, double-tap, n-tap, etc.). The touch input may, for example, comprise a touch input on a graphical user interface feature being presented to the user on a touch screen. The touch input may also, for example, comprise a swipe input (e.g., for adjustment of media presentation characteristics, like volume, etc.). Also for example, the user interface module 520 may comprise a microphone sensor and associated circuitry for processing audible inputs (e.g., voice commands).

The sensors may, for example, be included on or within an enclosure of the device 500. Additionally for example, the sensors may be physically separate from the device 500. As discussed herein, for example, touch sensors may be incorporated into switch plates, door frames, doors, etc., and thus need not necessarily be physically integrated with the device 500. In such example implementations, the sensors may be hardwired with the device 500 and/or may wirelessly communicate with the device 500. In a wireless communication scenario, the user interface module 520 may utilize wireless communication capability of the communication interface module 530 discussed herein.

The user interface module 520 may also, for example, comprise any one or more of a variety of user output devices (e.g., for providing audio feedback to a user, for visual output feedback to a user, etc.). For example, the user interface module 520 may operate to provide output to the user to indicate the mode of operation in which the device 500 is operating, to indicate the media output characteristics of the media currently being presented to the user, to output user input features (e.g., graphical user interface features), etc.

The user interface module 520 may further, for example, operate to interface with a remote control device (e.g., a dedicated remote control device, a smart phone, etc.). For example, the user interface module 520 may utilize the communication interface module 530 to communicate with the user's smart phone.

The example device 500 may additionally, for example, comprise a communication interface module 530. The communication interface module 530 may, for example, be operable to perform any or all of the communication functionality discussed herein (e.g., in the discussions of FIGS. 1-4). Such communication functionality may, for example, comprise communicating with other devices (e.g., other loudspeakers, central controllers, media servers, etc.). Such communication functionality may, for example, comprise communicating information regarding general system operation, user inputs, media content, etc.

The communication interface module 530 may, for example, be operable to establish, maintain, and utilize communication links with other devices (e.g., with loudspeakers, with a central media controller, with a local media server within a premises over a local area network, with a remote media server outside of a premises over the Internet and/or other networks, etc.). The communication interface module 530 may, for example, be operable to communicate over wired, wireless, or optical links.

The communication interface module 530 may, for example, be operable to interface with a wired and/or wireless local area network (LAN), personal area network (PAN), wide area network (WAN), etc. The communication interface module 530 may, for example, be operable to interface with a telecommunication network (e.g., cellular, landline, satellite, etc.), a television network (e.g., cable, satellite, etc.), etc. The communication interface module 530 may, for example, be operable to communicate utilizing any of a variety of standard and/or proprietary communication protocols (e.g., WiFi, Ethernet, Bluetooth, 4G, 5G, LTE, MoCA, 802.15, etc.).

The example device 500 may also, for example, comprise an audio processing module 540. The audio processing module 540 may, for example, be operable to perform any or all of the audio processing functionality discussed herein. For example, the audio processing module 540 may be operable to perform functionality discussed herein with regard to blocks 220 and 230 of the example method 200 shown in FIG. 2; blocks 325, 335, 350, 355, 360, and 365 of the example method 300 shown in FIG. 3; blocks 430, 440, and 450 of the example method 400 shown in FIG. 4; etc.

For example, the audio processing module 540 may be operable to manage the presentation of audio content at a loudspeaker. For example, the audio processing module 540 may be operable to process audio data (e.g., decoding, decrypting, error-correcting, queuing, digital-to-analog converting, etc.). Also for example, the audio processing module 540 may be operable to control media presentation characteristics (e.g., on/off, volume level, bass/treble or other equalization effects, balance between a plurality of loudspeakers, managing stereo and/or surround-sound media presentation, etc.). As with all modules shown herein, the audio processing module 540 may, for example, be implemented as a stand-alone audio processor or may share a portion of a processor with one or more other modules.

The example device 500 may further, for example, comprise a loudspeaker amplifier 550 and loudspeaker 555. The loudspeaker amplifier 550 and loudspeaker 555 may, for example, be operable to convert electrical signals into mechanical loudspeaker motion (e.g., of one or more loudspeaker membranes, cones, etc.) and thereby generate user-perceivable sound.

The example device 500 may, for example, comprise a processor 560 and a memory 570. Any or all of the functionality or associated modules discussed herein may, for example, be implemented in hardware and/or implemented using a combination of hardware and software (e.g., a processor operating in accordance with software instructions stored on a non-transitory computer-readable medium). For example, the processor 560 may operate in accordance with software instructions stored in the memory 570 to implement all or any part of the modules discussed herein. The processor 560 may, for example, comprise a general-purpose microprocessor, a digital signal processor (DSP), an application specific integrated circuit (ASIC), a microcontroller, etc. The memory 570 may, for example, comprise non-volatile and/or volatile memory. Note that the memory 570 may also be utilized for storing media content, media presentation characteristics, user profile information, etc.

As discussed herein, any or all of the functionality discussed herein may be performed by a media presentation device (e.g., a loudspeaker) or a plurality of media presentation devices working together. Also as discussed herein, any or all of the functionality discussed herein may be performed by a central media controller, a media server, etc. An example central media controller and/or media server will now be presented.

FIG. 6 is a block diagram of an example media controller 600, in accordance with various aspects of the present disclosure. The example media controller 600 may, for example, share any or all characteristics with the device 500 illustrated in FIG. 5 and discussed herein. The example media controller 600 may, for example, operate to or be operable to perform any or all of the functionality discussed herein (e.g., with regard to the example methods illustrated in FIGS. 2-4 and discussed herein). The media controller 600 may, for example, comprise a central audio controller, but the scope of this disclosure is not limited thereto. The media controller 600 may, for example, comprise any of a variety of media controller devices (e.g., audio controller, video controller, multi-media controller, etc.). The media controller 600 may, for example, share any or all characteristics with the central controller 111 shown in FIG. 1.

The example media controller 600 may, for example, comprise a power supply module 610. The power supply module 610 may, for example, comprise electrical circuitry operable to receive and/or prepare electrical power for utilization by the other modules of the media controller 600. The power supply module 610 may, for example, comprise an A/C power module adapted for plugging into a premises power outlet and/or for direct integration into the A/C power system of a premises. The power supply module 610 may also, for example, be operable to receive and/or prepare electrical power from a power-over-Ethernet (POE) system. The power supply module 610 may additionally, for example, be operable to receive and/or prepare battery power (e.g., manage battery operation for power supply, recharging, etc.). The power supply module 610 may also, for example, be operable to provide electrical power (e.g., via Ethernet or other wiring) to media presentation devices (e.g., to loudspeakers).

The example media controller 600 may also, for example, comprise a user interface module 620. The user interface module 620 may, for example, be operable to perform any or all of the user interface functionality discussed herein. For example, the user interface module 620 may be operable to perform the functionality discussed herein with regard to block 210 of the example method 200 illustrated in FIG. 2 and with regard to block 315 of the example method 200 illustrated in FIG. 3. Also for example, the user interface module 620 may be operable to communicate with a user regarding general operation and configuration of the media presentation system controlled by the media controller 600.

For example, the user interface module 620 may comprise any one or more of a variety of sensors for user input. For example, the user interface module 620 may comprise a touch sensor and associated circuitry for processing touch inputs. The touch sensor for user touch input may, for example, comprise a touch pad, touch screen, heat sensor, capacitive sensor, piezo-resistive sensor, piezo-electric sensor, light sensor, MEMS inertial sensor, etc. The touch input may, for example, comprise a tap input (e.g., single-tap, double-tap, n-tap, etc.). The touch input may, for example, comprise a touch input on a graphical user interface feature being presented to the user on a touch screen. The touch input may also, for example, comprise a swipe input (e.g., for adjustment of media presentation characteristics, like volume, etc.). Also for example, the user interface module 620 may comprise a microphone sensor and associated circuitry for processing audible inputs (e.g., voice commands).

The sensors may, for example, be included on or within an enclosure of the media controller 600. Additionally for example, the sensors may be physically separate from the media controller 600. As discussed herein, for example, touch sensors may be incorporated into switch plates, door frames, doors, etc., and thus need not necessarily be physically integrated with the media controller 600. In such example implementations, the sensors may be hardwired with the media controller 600 and/or may wirelessly communicate with the media controller 600. In a wireless communication scenario, the user interface module 620 may utilize wireless communication capability of the communication interface module 530 discussed herein.

The user interface module 620 may also, for example, comprise any one or more of a variety of user output devices (e.g., for providing audio feedback to a user, for visual output feedback to a user, etc.). For example, the user interface module 620 may operate to provide output to the user to indicate the mode of operation in which the media controller 600 is operating, to indicate the media output characteristics of the media currently being presented to the user, to output user input features (e.g., graphical user interface features), etc.

The user interface module 620 may further, for example, operate to interface with a remote control device (e.g., a dedicated remote control device, a smart phone, etc.). For example, the user interface module 620 may utilize the communication interface module 630 to communicate with the user's smart phone.

The example media controller 600 may additionally, for example, comprise a communication interface module 630. The communication interface module 630 may, for example, be operable to perform any or all of the communication functionality discussed herein (e.g., in the discussions of FIGS. 1-4). Such communication functionality may, for example, comprise communicating with other devices (e.g., other loudspeakers, central controllers, media servers, etc.). Such communication functionality may, for example, comprise communicating information regarding general system operation, user inputs, media content, etc.

The communication interface module 630 may, for example, be operable to establish, maintain, and utilize communication links with other devices (e.g., with loudspeakers, with a central media controller, with a local media server within a premises over a local area network, with a remote media server outside of a premises over the Internet and/or other networks, etc.). The communication interface module 630 may, for example, be operable to communicate over wired, wireless, or optical links. The communication interface module 630 may, for example, comprise a plurality of separate (or time-duplexed) communication modules for communication with a plurality of media presentation devices (e.g., loudspeakers) simultaneously.

The communication interface module 630 may, for example, be operable to interface with a wired and/or wireless local area network (LAN), personal area network (PAN), wide area network (WAN), etc. The communication interface module 630 may, for example, be operable to interface with a telecommunication network (e.g., cellular, landline, satellite, etc.), a television network (e.g., cable, satellite, etc.), etc. The communication interface module 630 may, for example, be operable to communicate utilizing any of a variety of standard and/or proprietary communication protocols (e.g., WiFi, Ethernet, Bluetooth, 4G, 5G, LTE, MoCA, 802.15, etc.).

Though not illustrated, the media controller 600 may comprise an audio processing module, loudspeaker amplifier, and loudspeaker, as discussed with regard to FIG. 5.

The example media controller 600 may, for example, comprise a processor 660 and a memory 670. Any or all of the functionality or associated modules discussed herein may, for example, be implemented in hardware and/or implemented using a combination of hardware and software (e.g., a processor operating in accordance with software instructions stored on a non-transitory computer-readable medium). For example, the processor 660 may operate in accordance with software instructions stored in the memory 670 to implement all or any part of the modules discussed herein. The processor 660 may, for example, comprise a general-purpose microprocessor, a digital signal processor (DSP), an application specific integrated circuit (ASIC), a microcontroller, etc. The memory 670 may, for example, comprise non-volatile and/or volatile memory. Note that the memory 670 may also be utilized for storing media content, media presentation characteristics, user profile information, etc.

In summary, various aspects of this disclosure provide a multi-zone media system and method for providing multi-zone media. While the foregoing has been described with reference to certain aspects and embodiments, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular embodiment(s) disclosed, but that the disclosure will include all embodiments falling within the scope of the appended claims.

What is claimed is:

1. A system, the system comprising:
   a first speaker operable to output a first audio signal synchronously with a second audio signal output from a second speaker, wherein:
   the second speaker is located remotely from the first speaker,
   the first speaker is operable to receive, from a media controller, digital audio data representative of the first audio signal, and
   the digital audio data received by the first speaker is modified according to a location of the first speaker and a location of the second speaker.

2. The system of claim 1, wherein the digital audio data received by the first speaker is delayed according to a location of a listener.

3. The system of claim 1, wherein the first speaker is operable to modify the digital audio data received by the first speaker.

4. The system of claim 1, wherein the media controller is operable to determine, according to a voice command, when the digital audio data is to be modified.

5. The system of claim 1, wherein the first audio signal output by the first speaker is stopped according to a triggering event.

6. The system of claim 5, wherein the triggering event comprises a user input in a first zone.

7. The system of claim 5, wherein the triggering event comprises a user input at a sensor of the first speaker.

8. The system of claim 5, wherein the triggering event comprises a particular voice command.

9. The system of claim 1, wherein the first speaker is operable to wirelessly communicate with the second speaker.

10. The system of claim 1, wherein the first audio signal is selected according to a voice command associated with a particular user.

11. A method, the method comprising:
    via a first speaker:
    outputting a first audio signal synchronously with a second audio signal output from a second speaker, wherein the second speaker is located remotely from the first speaker,
    receiving, from a media controller, digital audio data representative of the first audio signal, and
    modifying the digital audio data according to a location of the first speaker and a location of the second speaker.

12. The method of claim 11, wherein the method comprises delaying the digital audio data according to a location of a listener.

13. The method of claim 11, wherein the first speaker is operable to modify the digital audio data received by the first speaker.

14. The method of claim 11, wherein the media controller is operable to determine, according to a voice command, when the digital audio data is to be modified.

15. The method of claim 11, wherein the method comprises stopping the first audio signal output by the first speaker according to a triggering event.

16. The method of claim 15, wherein the triggering event comprises a user input in a first zone.

17. The method of claim 15, wherein the triggering event comprises a user input at a sensor of the first speaker.

18. The method of claim 15, wherein the triggering event comprises a particular voice command.

19. The method of claim 11, wherein the method comprises wirelessly communicating between the first speaker and the second speaker.

20. The method of claim 11, wherein the first audio signal is selected according to a voice command associated with a particular user.

* * * * *